No. 666,421. Patented Jan. 22, 1901.
T. C. HEFEL.
FILTER.
(Application filed June 27, 1900.)
(No Model.) 2 Sheets—Sheet 1.

WITNESSES,

INVENTOR,

No. 666,421. Patented Jan. 22, 1901.
T. C. HEFEL.
FILTER.
(Application filed June 27, 1900.)
(No Model.) 2 Sheets—Sheet 2.

WITNESSES,
Thomas L. Ryan
L. H. Howard

INVENTOR,
Toney C. Hefel
by
W. DuVal Brown
ATTORNEY.

UNITED STATES PATENT OFFICE.

TONEY C. HEFEL, OF MUNCIE, INDIANA, ASSIGNOR OF ONE-HALF TO CHARLES H. RUSSEY, OF SAME PLACE.

FILTER.

SPECIFICATION forming part of Letters Patent No. 666,421, dated January 22, 1901.

Application filed June 27, 1900. Serial No. 21,789. (No model.)

*To all whom it may concern:*

Be it known that I, TONEY C. HEFEL, a citizen of the United States, residing at West Muncie, in the county of Delaware and State of Indiana, have invented a new and useful Filter, of which the following is a specification.

This invention relates to an improvement in filters, but more specifically to a filter invented by me and shown in a patent issued to me, dated September 27, 1898, No. 611,317.

The aim and purpose of the present improvement is to provide means for cheaply and thoroughly cleaning the filtering material without removing the same from the filtering-basin. These and other objects not hereinbefore mentioned are accomplished by the construction illustrated in the accompanying drawings, wherein like letters of reference indicate corresponding parts in the several views, and in which—

Figure 1:
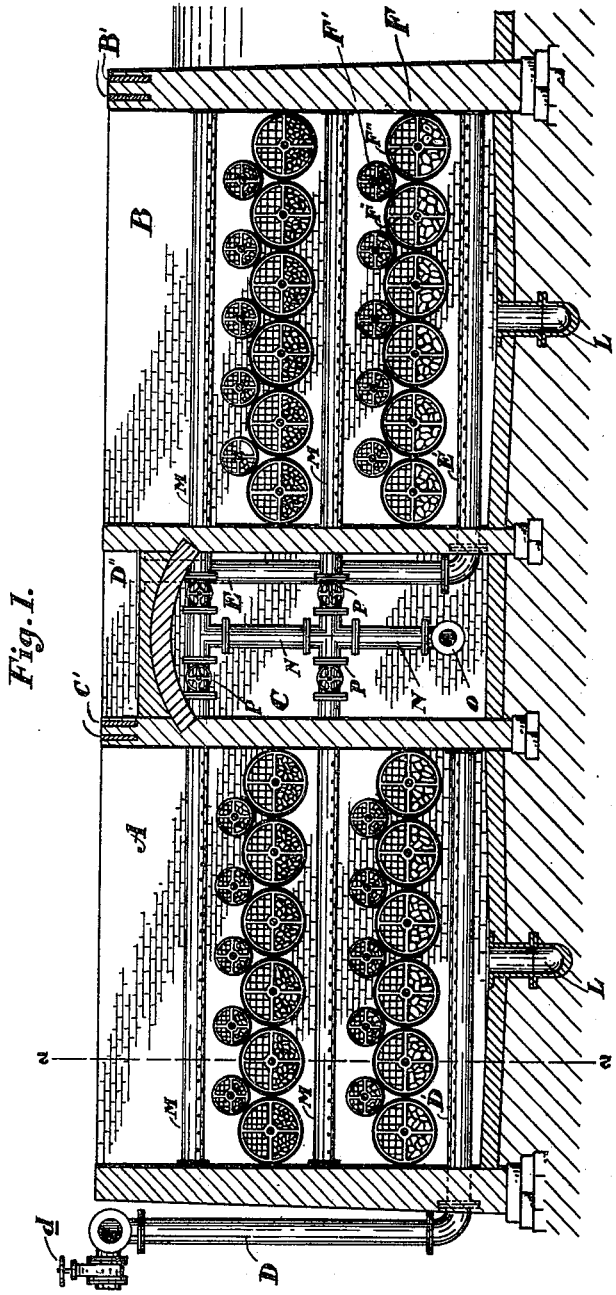
Figure 2:
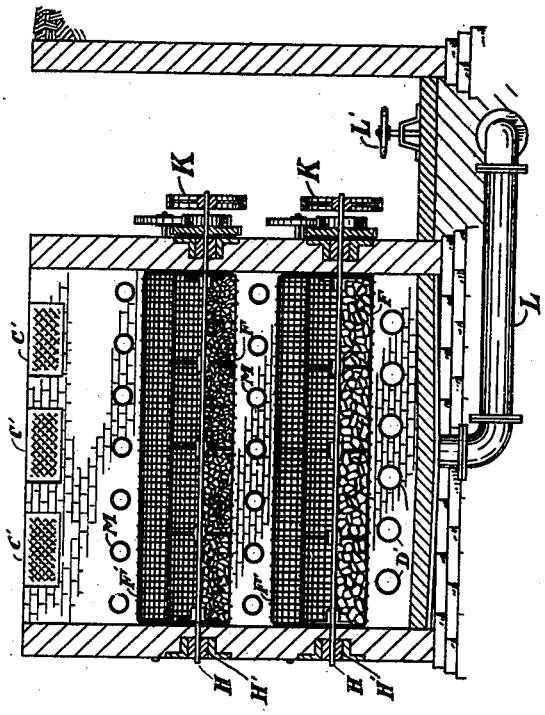
Figure 3:
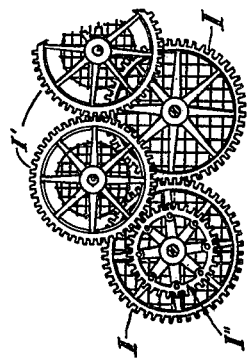
Figure 4:
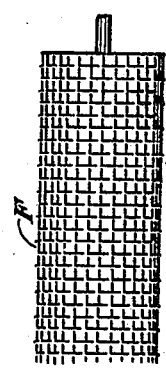

Figure 1 is a vertical longitudinal section through my improved filter. Fig. 2 is a cross-section on the line 2 2, Fig. 2. Fig. 3 is an enlarged side elevation of the operating-wheels for actuating the cylinders, and Fig. 4 is a detail view of one of the cylinders detached from the filtering-basin.

In the drawings I show two filtering-basins A and B, respectively, although it is obvious that I could use any number, according to the requirements of the water to be filtered. A is the inlet-basin, and B the outlet-basin. The two basins are separated by a chamber C, which has a passage-way D″ on its top. The water passes into the first filtering-basin through the inlet-pipe D and escapes into the basin from the horizontal perforated pipe D′, located at the bottom of the basin. The water then rises up through the filtering devices hereinafter described and passes through the screen C′ and through the passage-way D″, then down through the pipes E to the bottom of the second filtering-basin B, and escapes through the horizontal perforated pipes E′. *d* designates a valve for shutting off the water-supply. The water then passes upward through the filtering devices hereinafter described and escapes through the screens B′ into the settling-basin. (Not shown.)

In my former patent hereinbefore mentioned I placed the filtering material in the basins in layers, separating the different materials used by means of perforated dividing-plates. I find in practice that there is some difficulty in flushing and cleaning the filtering material, and therefore I now place the filtering material in cylinders in the form of a screen which can be revolved when it is desired to flush and clean the material.

In carrying out my invention I provide two sets of cylinders in each basin, the sets being arranged one above the other. Each set consists of a row of cylinders F, extending entirely across the basin, as plainly shown in Fig. 2, and a smaller row of cylinders F′, also extending entirely across the basin and located above and between the peripheries of the lower and larger set of cylinders. In the lower set of cylinders in each basin I preferably place gravel, and in the upper set of cylinders in each basin I preferably place sand. I do not desire to limit myself to these filtering materials or to the number of sets of cylinders, as it is obvious that the filtering material and the number of sets of cylinders could be changed without departing from the spirit of my invention. The cylinders in the lower and larger set are arranged very close together and extend entirely across the basin, having their ends practically touching the side walls thereof, so that no water can leak up around the side or ends of the cylinders. The smaller cylinders of the upper set also extend entirely across the basin, having their ends practically abutting against the side walls thereof. It will be noticed that these small cylinders are placed between the peripheries of the larger cylinders and very close to them, so that if any water should happen to leak between the lower cylinders it would have to pass through the upper cylinders before reaching the top of the basin. As these cylinders only revolve at intervals, as described, it is possible to place them very close together and have their ends abut closely against the sides of the basin. I find by this construction that the amount of water, if any, which is not passed through the filtering-cylinders has no appreciable effect on the purity of the water after being filtered. In practice I preferably only partially fill the cylinders with the filtering material, for the reason that when the cylinders are being revolved for the purpose of cleaning, hereinafter described, the material will be thoroughly shaken up, allowing the dirt and sediment to be removed therefrom.

F'' designates spokes in the inside of the cylinders to strengthen the same. These spokes extend from a central axle H, which rests in bearings H', placed in the side walls of the basins, as plainly shown in Fig. 2. The axles on one side of the basins extend out beyond the side walls and are provided with gear-wheels. On the axles of the larger cylinders are the gear-wheels I, which mesh with each other. On the axles of the smaller cylinders are gear-wheels I'. These gear-wheels also mesh together. On the axle of the first large cylinder is a smaller gear-wheel I'', which meshes with the gear-wheel I' on the axle of the first small cylinder. The arrangement of the gear-wheels is plainly shown in Fig. 3.

K is a power-wheel on the axle of the first large cylinder. It will be seen that when power is applied to this wheel all the cylinders will revolve and shake up the filtering material placed therein.

L designates a sewer connection located at the bottom of each basin, controlled by a valve Q'.

Located above each set of cylinders are a series of pipes M, which are perforated and have one end secured to the end walls of the basin and have their opposite ends extend into the chamber C, where they connect with the down-pipes N, which in turn connect with a fresh-water-supply pipe O. The flush-pipes are controlled by the valves P.

During the process of filtration the cylinders are stationary and the sewer connection closed. When it is desired to flush and clean the device, the valve d is closed, shutting off the supply, the sewer connection is opened, the cylinders started to revolve, and the flush-pipes turned on. By the cylinders revolving the filtering material is thoroughly shaken up, and the flush-pipes being directly above the cylinders the material is thoroughly and quickly cleaned of all dirt, sediment, or clog found in the water either by chemicals or however produced. The cylinders can be revolved slowly and produce good results, so that it is not necessary to employ much power to revolve them.

I am aware that many minor changes can be made in the construction and arrangement of parts without in the least departing from the nature and principles of my invention.

Having thus fully described my invention, what I claim as new, and desire to secure by Letters Patent, is—

1. In a filtering plant for waterworks, the combination with a filtering-basin having an inlet and outlet, cylinders in the basin holding the filtering material and through which the water to be filtered is adapted to pass, means for revolving the cylinders and a flush-pipe located above the cylinders.

2. In a filtering plant for waterworks, the combination with a filtering-basin having an inlet and outlet, a series of transversely-arranged cylinders in the basin holding the filtering material and through which the water to be filtered is adapted to pass, means located on the outside of the basin for simultaneously revolving the cylinders, and a flush-pipe located above the cylinders.

3. In a filtering plant for waterworks, the combination with a filtering-basin having an inlet and outlet, a chamber at one end of the basin, cylinders in the basin holding the filtering material and through which the water to be filtered is adapted to pass, means for revolving the cylinders, a flush-pipe above the cylinders having one end extending into the chamber, and a valve in the chamber adapted to control the flush-pipe.

4. In a filtering plant for waterworks, the combination with a filtering-basin having an inlet and outlet, a set of cylinders in the basin holding the filtering material and through which the water to be filtered is adapted to pass, the set of cylinders consisting of a series of cylinders, and a series of cylinders of less diameter located directly above the lower and larger cylinders and between the peripheries of the lower cylinders, means for revolving the set of cylinders, and a flush-pipe located above the set of cylinders.

5. In a filtering plant for waterworks, the combination with a filtering-basin having an inlet and outlet, a series of cylinders in the basin holding the filtering material and through which the water to be filtered is adapted to pass, axles journaled in the walls of the basin on which the cylinders are mounted, the axles having an extension on one end extending to the outside of the basin, gear-wheels on these extensions meshing with each other, and a power-wheel on one of the extensions.

In testimony whereof I have hereunto set my hand in the presence of two witnesses.

TONEY C. HEFEL.

Witnesses:
  WM. DU VAL BROWN,
  L. C. HOWARD.